United States Patent [19]

Leiber

[11] Patent Number: 4,660,897
[45] Date of Patent: Apr. 28, 1987

[54] BRAKE SYSTEM WITH BRAKE BOOSTER

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 790,006

[22] Filed: Oct. 22, 1985

[30] Foreign Application Priority Data

Dec. 21, 1984 [DE] Fed. Rep. of Germany ....... 3446824

[51] Int. Cl.$^4$ ................................................ B60T 8/10
[52] U.S. Cl. .................................... 303/114; 60/555; 303/110
[58] Field of Search ................ 60/548, 555, 556, 581, 60/584; 303/110, 113, 114, 119

[56] References Cited

U.S. PATENT DOCUMENTS

| 3,667,813 | 6/1972 | Burckhardt et al. | 303/96 |
| 4,034,566 | 7/1977 | Suketomo et al. | 60/548 |
| 4,123,117 | 10/1978 | Adachi | 303/114 |
| 4,440,454 | 4/1984 | Belart et al. | 303/114 |
| 4,526,003 | 7/1985 | Leiber | 303/114 X |

Primary Examiner—Duane A. Reger
Attorney, Agent, or Firm—Edwin E. Greigg

[57] ABSTRACT

A brake system having a master cylinder for generating brake pressures in at least one closed brake circuit (I, II) and having an associated brake booster including a booster cylinder, a displaceable booster piston having a piston rod oriented into the master cylinder and a tappet arranged to plunge into the booster cylinder by means of a brake pedal and be displaced counter to the booster piston and is equipped with a brake valve connected to a pressure supply device, which brake valve is controllable by means of the relative movement of the tappet with respect to the booster piston. The brake system may be modified to become an anti-drive-slip apparatus via brake pressure maintenance valves built into the brake circuits (I, II), as well as a 3/3-way valve, by means of which pressure medium can be sent directly from the pressure supply device for exerting boosting action on the booster piston into the booster cylinder. Pressure in-feed causes a displacement of the booster piston and accordingly brings about the generation of brake pressures for overcoming drive slip. Once the drive slip is substantially eliminated, then the booster cylinder is relieved of pressure by means of the 3/3-way valve, so that the booster piston moves in the direction of its basic position.

20 Claims, 2 Drawing Figures

BRAKE SYSTEM WITH BRAKE BOOSTER

BACKGROUND OF THE INVENTION

The invention is directed to improvements in vehicle brake systems. An external force vehicle brake system is known from U.S. Pat. No. 3,667,813, the wheel brake cylinders of which can be acted upon with pressure from a pressure supply device for braking via a brake valve which is actuatable by means of a brake pedal. A failure of the pressure supply device results in the complete failure of the external force vehicle brake system.

In at least one brake line of this vehicle brake system, electrically controllable valves are installed to reduce undesirable drive wheel slip, for instance, when beginning to drive on a road surface with less grip. To reduce drive wheel slip, one of the valves provides a bypass from the pressure supply device around the brake valve to the particular wheel brake the wheel of which is skidding because of excessive drive torque. Another valve, which is disposed directly following the brake valve, simultaneously prevents the outflow of pressure medium through the non-actuated brake valve. A further valve, which is connected to the brake line between the last-named valve and the wheel brake is opened whenever the drive wheel slip has dropped sufficiently or has ended, so that the brake line is pressure-relieved to a supply container of the pressure supply device. The valve that can be opened toward the supply container has the disadvantage that if it should lock in its opened position, it renders the associated wheel brake ineffective.

From U.S. Pat. No. 4,034,566, it is known to associate a brake booster with a master cylinder which supplies at least one closed and therefore inherently safe brake circuit, the brake booster having a booster cylinder, a booster piston, a tappet that is displaceable by means of a brake pedal toward the booster piston, a brake valve actuatable by the relative movements of the tappet toward the booster piston, and a pressure supply device joined with the brake valve. By means of the brake pedal, via the tappet, the brake valve is actuated for feeding in boosting pressures into the booster cylinder. If boosting pressures are absent, then the booster piston can be displaced by means of the driver's foot, via the tappet in order to generate emergency braking pressures.

OBJECT AND SUMMARY OF THE INVENTION

It is a principal object of the invention to provide a brake system having the advantage over the prior art that drive wheel slip can be reduced while using a master cylinder that is suitable for emergency braking if the boosting fails and while using closed brake circuits which have a high degree of operational reliability.

It is another object of the invention to embody the brake valve and booster piston in a spacesaving and inexpensive manner together and so as to prevent a disadvantageous outflow of pressure medium from the booster chamber while the drive wheel slip is being reduced.

It is still another object to the invention to provide that the brake valve, in the unactuated state, leaves open merely a throttle cross section, which on the one hand diverts leakage flows away and on the other hand, when pressure medium is fed into the booster chamber in order to reduce the drive wheel slip, the brake valve effects a pronounced pressure increase in this booster chamber, thus causing an extremely rapid acceleration of the booster piston in the direction of the master cylinder.

It is yet another object of the invention that in the case of braking controlled via the brake pedal, that for rapid reduction of boosting pressure by retracting the brake pedal, a maximum possible cross section is providable for reducing pressure.

It is still a further object of the invention that the maximum possible spacing between the booster piston and the tappet is limited, and that the brake valve therefore have an extent no longer, or only insignificantly longer, than brake valves known in the prior art.

It is yet a further object of the invention to provide an economical exemplary variant, which is particularly easily realized if the booster piston is cup-shaped in embodiment and is aligned as such that the tappet can plunge with at least a portion of its length into the booster piston. In addition, this construction has the advantage that a pressure can be fed into the auxiliary chamber which pressure displaces the piston rod in the direction of the master cylinder to thereby effect the switchover of the brake valve into an additional third switching position, so as to prevent the outflow of pressure medium from the booster chamber. Thus, drive wheel slip is reduced because of the action on the booster piston and the brake pressure generation thereby effected in the master cylinder.

It is yet an additional object of the invention to embody, at little additional expense, the valves such that undesirable brake wheel slip or even wheel locking can also be avoided.

It is still another object of the invention to provide that subsequent rises of brake pressure again after brake slip reductions can take place in a desirably damped manner.

It is yet another object of the invention that the brake system have a high degree of operational reliability.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
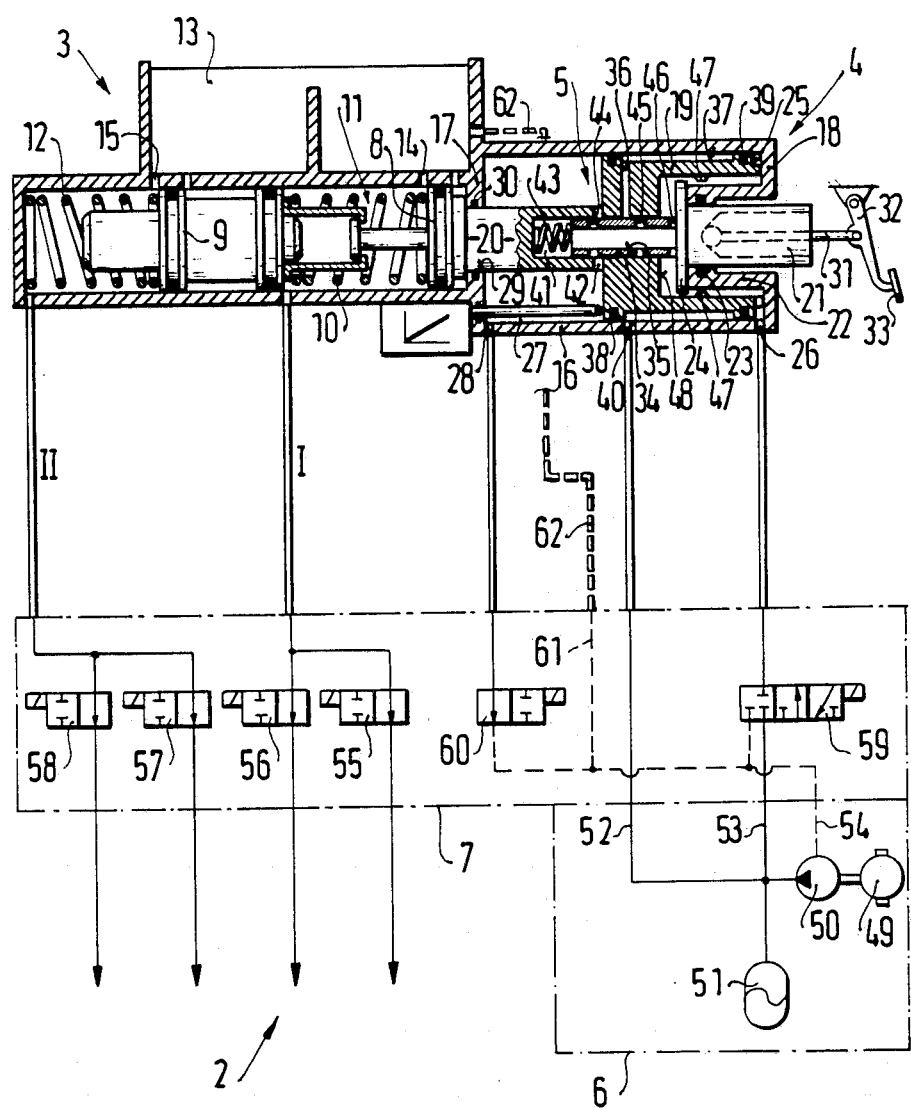
FIG. 1 shows a first exemplary embodiment of the brake system according to the invention.

The first exemplary embodiment of the brake system 2 shown in FIG. 1 has a master cylinder 3, a brake booster 4, a brake valve 5, a brake supply device 6, and an anti-drive-slip device 7.

The master cylinder 3 includes a first master cylinder piston 8, a second master cylinder piston 9, a spreading spring 10, a restraining device 11 for the spreading spring 10, a restoring spring 12 and a supply container 13 having extension ports 14 and 15. The spreading spring 10 is installed between the first master cylinder piston 8 and the second master cylinder piston 9 and tends to spread the two master cylinder pistons 8 and 9 apart. The restraining device 11 is taken from the well-known prior art, and its individual elements therefore need not be described in detail here. This restraining device 11 serves to limit the expansion of spreading spring 10, so that the spreading spring 10 can spread the master cylinder pistons 8 and 9 apart to merely a predetermined extent. The restoring spring 12 is installed in the master cylinder 3 in such a way that it presses against the second master cylinder piston 9, thus tending to push it in the direction of the first master cylinder piston 8. Both springs 10, 12 assure that the two master cylinder pistons 8 and 9 are displaced into initial positions in which brake circuits I and II connected to the master cylinder 3 communicate all the way through the master cylinder 3 along the master cylinder pistons 8, 9 and on through the expansion ports 14 and 15 with the supply container 13.

The brake booster 4 has a booster cylinder 16 having a first end wall 17 oriented toward the master cylinder and a second end wall 18, a booster piston 19, a piston rod 20 and a tappet 21. The booster piston 19 is substantially cup-shaped in embodiment and is open toward the second end-wall 18. A tubular protrusion 22 begins at the end wall 18, pointing in the direction of the master cylinder 3 and having a smaller outer diameter than the inside diameter of the cup-shaped booster piston 19. The tubular protrusion 22 is arranged to receive the tappet 21 in the longitudinally displaceable manner. A sealing ring 23 is provided in the tubular protrusion 22 to assure that no pressure medium escapes along the tappet 21. The tappet 21 has a stop collar 24, which is located inside the booster cylinder 16 and against which the tubular protrusion 22 forms a stop. Between the booster piston 19 and the second end wall 18, the booster cylinder 16 serves to enclose a booster chamber 25. This booster chamber 25 has a booster chamber connection 26 adjacent to the second end wall 18. Between the booster piston 19 and the first end wall 17, the booster cylinder 16 surrounds an auxiliary chamber 27. This auxiliary chamber 27 has an auxiliary chamber connection 28 near the end wall 17. The piston rod 20 is cylindrically embodied and is displaceable inside a bore 29 which is provided in the first end wall 17. A sealing ring 30 prevents the outflow of pressure medium along the cylindrical piston rod 20. In the exemplary embodiment, the tappet 21, the booster piston 19 and the piston rod 20 are aligned coaxially. For displacing the tappet 21, a pedal rod 31, a brake pedal lever 32, and a brake pedal 33 are provided.

The brake valve 5 is also aligned coaxially with the tappet 21 and is furthermore integrated with the booster piston 16. The brake valve 5 has a control slide 34, which is tubular in embodiment and is joined to the tappet 21, as well as a control sleeve 35, which is formed in a known manner by disposing a bore in the booster piston 19. The control sleeve 35 has an inflow bore 36, which extends radially through the booster piston 19 and discharges into a circumferential groove 37, which is machined into the booster piston 19. The booster piston 19 has sealing rings 38, 39 at both extremities of the circumferential groove 37, which rest on the booster cylinder 16. In alignment with the circumferential groove 37, the booster cylinder 16 has a supply connection 40. The piston 20 is structurally included in the control sleeve 35 in such a manner that the bore mentioned above extends into this piston rod, and in this piston rod 20 it forms a hollow chamber 41. Adjacent to the booster piston 19, at least one outlet bore 42 is provided, which extends radially through the piston rod 20. Thus at least one outlet bore 42 forms a substantial component of the brake valve 5. A restoring spring 43 is built into the hollow chamber 41. This spring urges the control slide 34 in the direction of the brake pedal lever 32. The control slide 34 includes pressure-reducing control bores 44 associated with at least one outlet bore 42, a pressure-increasing control bore 45 associated with the inflow bore 36 and adjacent to the stop collar 24 has compensating bores 46, which discharge into the booster chamber 25. The bores 44, 45 and 46 penetrate a wall of the control slide 34, for instance, in a radial direction.

The restoring spring 12 and the spreading spring 10 already described urge the first master cylinder piston 8 in the direction of the piston rod 20 as already noted. These two springs 10 and 12 can displace the booster piston 19 into a basic position, counter to the force of the weaker restoring spring 43, if no pressure is exerted on the booster piston 19 and no actuation of the brake pedal 33 takes place. In so doing, the booster piston 19 can rest, for instance, on the second end wall 18. The end wall 18 can thus represent an axial stop for the booster piston 19. The restoring spring 43 assures that via the control slide 34 the tappet 21 is displaced in the direction of the brake pedal 33, and thus with its stop collar 24 comes into contact with the tubular protrusion 22, which as already noted likewise forms an axial stop and determines the basic position. If the tappet 21 and the booster piston 19 are located in the basic positions explained above, then the control slide 34 closes the inflow bore 36 in the same manner as the control sleeve 35 closes the pressure-increasing control bore 45. The outlet bore 42 and the associated pressure-reducing control bore 44 intersect, while the pressure-reducing control bore 44 is located slightly nearer the master cylinder 3 than is the outlet bore 42. As a result, these control bores 42 and 44 form outlet cross sections, which are narrower than their respective own cross sections.

If beginning at the basic position of the booster piston 19 as described, this booster piston is displaced in any way toward the master cylinder 3, then first the outlet bores 42 and the control bores 44 come to coincide exactly, so that they furnish the largest possible outlet cross sections. Compared with these largest possible outlet cross sections, the previously described narrower outlet cross sections represent throttling restrictions, which will be described in further detail later. Upon further displacement of the booster piston 19 in the direction of the master cylinder 3 the outlet cross sections decrease in size and finally the control slide 34 closes the outlet bores 42. Because the control slide 34 is tubular in embodiment, upon the bores 42 and 44 intersecting each other, the pressure which prevails in the booster chamber 25 is capable of being reduced through the compensating bores 46 and the control slide 34 in the outlet cross sections, the auxiliary chamber 27 and its auxiliary chamber connection 28.

If only the tappet 21 is displaced by means of the brake pedal 33 toward the master cylinder 3, beginning at the basic positions of the booster piston 19 and of the tappet 21, then first the control slide 34 closes the outlet bores 42, and subsequently the pressure-increasing control bore 45 intercepts with the inflow bore 36, so that the supply connection 40 communicates with the booster chamber 25 via the circumferential groove 37 and the compensating bores 46.

The cup-shaped booster piston 19 has stops 47 on its inside which protrude radially inward in the form of protrusions which on the side toward the brake pedal extend as far as next to the stop collar 24. In the longitudinal direction of the booster piston 19, the stops 47 are aligned such that the stop collar 24 comes to rest on them at such time as the control slide 34, upon the movement of the booster piston 19 toward the master cylinder 3, has closed the outlet bores 42. A further displacement of the booster piston 19 in the direction of the master cylinder 3 now has the result that via the stop collar 24, the tappet 21 follows up a possible further displacement of the booster piston 19. Furthermore, as the drawings show, a movement of the tappet 21 in the direction of the master cylinder 3 is possible, until finally the stop collar 24 rests on a surface 48 of the booster piston 19. As a result, the booster piston 19 is also displaceable by means of the brake pedal 33 via the tappet 21.

The pressure supply device 6 is taken from the prior art, so it will suffice to mention a motor 49, a pump 50, and a pressure reservoir 51, as well as two pressure supply lines 52 and 53 and a return line 54.

The anti-drive-slip apparatus 7 includes pressure maintenance valves 55 through 58 connected to the brake circuits I and II, which valves are embodied as 2/2-way valves and in their basic positions are opened, and a multiple-positioned valve assembly 59 and an additional valve assembly 60. The valves 55–58 are normally open so that during normal braking due to pressure of the drums, foot brake pressure will be applied to the wheels due to fluid flow from the master cylinder via the valves 55–58 to the wheels. These valves are controlled to avoid wheel slip. During wheel slip, the valve to the wheel that is slipping remains open to permit braking of that wheel while the valves to the wheels that are not slipping are actuated to prevent fluid flow to those wheels not slipping. Thus, the valves 55–58 are for controlling wheel slip in combination with the valves 59 and 60 as explained thereafter. The more important of the two valve assemblies is the multiple-position valve assembly 59, which is, for instance, embodied as a 3/3-way valve which is electrically controllable. The 3/3-way valve 59 is built in between the pressure supply line 53, the return line 54 and the booster chamber connection 26. In its basic position, it blocks the booster chamber connection 26 relative to the pressure supply line 53 and the return line 54. In one switching position it connects the pressure supply line 53 with the booster chamber connection 26. In a further switching position, it divides the pressure supply line 53 from the booster chamber connection 26 and connects the booster chamber connection 26 to the return line 54. The other valve assembly 60 is embodied as a 2/2-way valve which is electrically controllable and in its basic position is open. In this basic position, it joins the auxiliary chamber connection 28 to the return line 54. The pump 50 draws its supply from the return line 54, which via connecting lines 61 and 62 also communicates with the supply container 13.

Mode of Operation of the First Exemplary Embodiment

If the pressure supply device 6 is not providing any pressure, then braking can be accomplished by the force of the driver's foot. To this end the brake pedal 33 is actuated, so that via its brake pedal lever 32 and the pedal rod 31, the tappet 21 is pressed with its stop collar 24 against the surface 48 of the booster piston 19. As a result, the booster piston 19 is displaced in the direction of the master cylinder 3, whereupon it displaces the two master cylinder pistons 8, 9 via the piston rod 20 and via the pistons 8, 9 generates brake pressures in the brake circuits I, II via open valves 55–58.

If the pressure supply device 6 is furnishing pressure, then the booster piston 19 can be displaced hydraulically. Upon the displacement of the control slide 34 by means of the brake pedal 33 relative to the control sleeve 35, the outlet bores 42 are closed. As a result, a pressure equalization between the booster chamber 25 and the auxiliary chamber 27 is no longer possible. Upon further displacement of the control slide 34 in the direction of the master cylinder 3 and relative to the booster piston 19 which is at rest, the pressure-increasing control bore 45 comes to intercept with the inflow bore 36. Since the pressure which the pressure supply device 6 furnishes prevails in the inflow bore 36, pressure medium flows through the control slide 34 and its compensating bores 46 into the booster chamber 25. This pressure medium exerts pressure upon the tappet 21, which forms a sensor piston, and also on the booster piston 19, which thereby begins to move in the direction of the master cylinder 3. If a balance of forces prevails between one force resulting from the described action of pressure medium upon the tappet 21 and another force which is generated by the driver and act in the opposite direction via the pedal rod, and the booster piston 19 moves in advance of the tappet 21 and the intersection of the pressure-increasing control bore 45 with the inflow bore 36 is ended. If the brake pedal 33 is retracted in order to reduce the brake pressure, then the pressure-reducing control bores 44 come to intersect with the outflow bores 42. As a result, a relief of pressure of the booster chamber 25 takes place in favor of the auxiliary chamber 27. Because the auxiliary chamber 27 in turn communicates with the supply container 13 via the opened 2/2-way valve 60 leading to the return flow line 54, the first master cylinder piston 8 can now be displaced toward the end wall 18, that is toward its basic position, as a result of the action of the springs 10 and 12 and of the brake pressures prevailing in the brake circuits I and II. As already mentioned in the structural description above, the final result is an alignment of the control slide 34 relative to the control sleeve 35, in which outlet cross sections, acting as throttles, remain open.

If drive wheel slip occurs upon at least one driven wheel because of excessive torque, then the anti-drive-slip apparatus 7 is switched on. The brake pressure maintenance valves 55 through 58 of those wheel brakes the associated wheels of which are not undesirably generating slip, are controlled into the blocking positions. The 3/3-way valve 59 is controlled into the particular switching position in which it joins the pressure supply device 6 to the booster chamber connection 26. As a result, pressure medium flows into the booster chamber 25, of which pressure medium a partial quantity first flows through the brake valve 5, which valve acts as a throttle because of the above-described structural characteristics, and into the auxiliary chamber 27. The throttle effects a pressure increase in the booster chamber 25, so that the booster piston 19 is acted upon. Because of this action, the booster piston 19 is accelerated in the direction of the master cylinder 3, so that the control sleeve 35 moves relative to the control slide 34. The bores 44 and 42 here initially furnish relatively large outlet cross sections, which however, become increasingly smaller and finally disappear. As a result, no further pressure medium escapes from the booster chamber 25, and a further increase of the action on the booster piston 19 takes place, which finally leads to increasing brake pressure in the brake circuits I and II. As a result, the brake pressure also rises in the driven wheel brake, the associated wheel of which is producing drive slip, so that the drive slip decreases due to a braking action of that particular wheel. Once the drive slip is sufficiently reduced or eliminated, then the 3/3-way valve 59 is switched over into its other switching position, wherein the booster chamber 25 is relieved of pressure via the switched-over 3/3-way valve 59. As a result, the brake pressure in the driven wheel brake drops as well. After the drive slip has ended at whatever wheels are slipping, the closed brake pressure maintenance valves are restored to their basic positions.

As already mentioned a partial quantity of pressure medium fed into the booster chamber flows through the brake valve 5. In order to spare the pumping work required for this, the 2/2-way valve 60 is temporarily switched into its blocking position during the switch over of the 3/3-way valve 59 into its pressure feeding switching position. The result is a pressure increase in the auxiliary chamber 27. Although this pressure increase does tend to urge a portion of the cross section of the booster piston 19 counter to its boosting action, still an effective cross section remains, the cross sectional area of which is predetermined by the diameter of the piston rod 20. This is sufficient for a first displacement of the booster piston 19 away from the tappet 21, so that the brake valve 5 allows no further pressure medium to flow through it. Then as soon as the 2/2-way valve 60 is open, the booster piston 19 moves in the intended manner toward the master cylinder 3, because of a pressure relief of the auxiliary chamber 27, and in the master cylinder generates the desired braking pressures. If the displacement of the booster piston 19 has become so great that the described closure of the brake valve 5 has taken place, then the at least one stop 47 engages the stop collar 24 and thereby pulls the tappet 21 behind the booster piston 19. The at least one stop 47 thus limits the relative movement between the booster piston 19 and the tappet 21, so that the brake valve 5 can be embodied with a short, space-saving structure and in an economical manner.

If controlled braking is performed by means of the brake pedal 33, then if the brake pedal 33 is retracted quickly, then relatively large outlet cross sections are made available by the outlet bores 42 and the pressure-reducing control bores 44, so that rapid drops in brake pressure take place.

Figure 2:
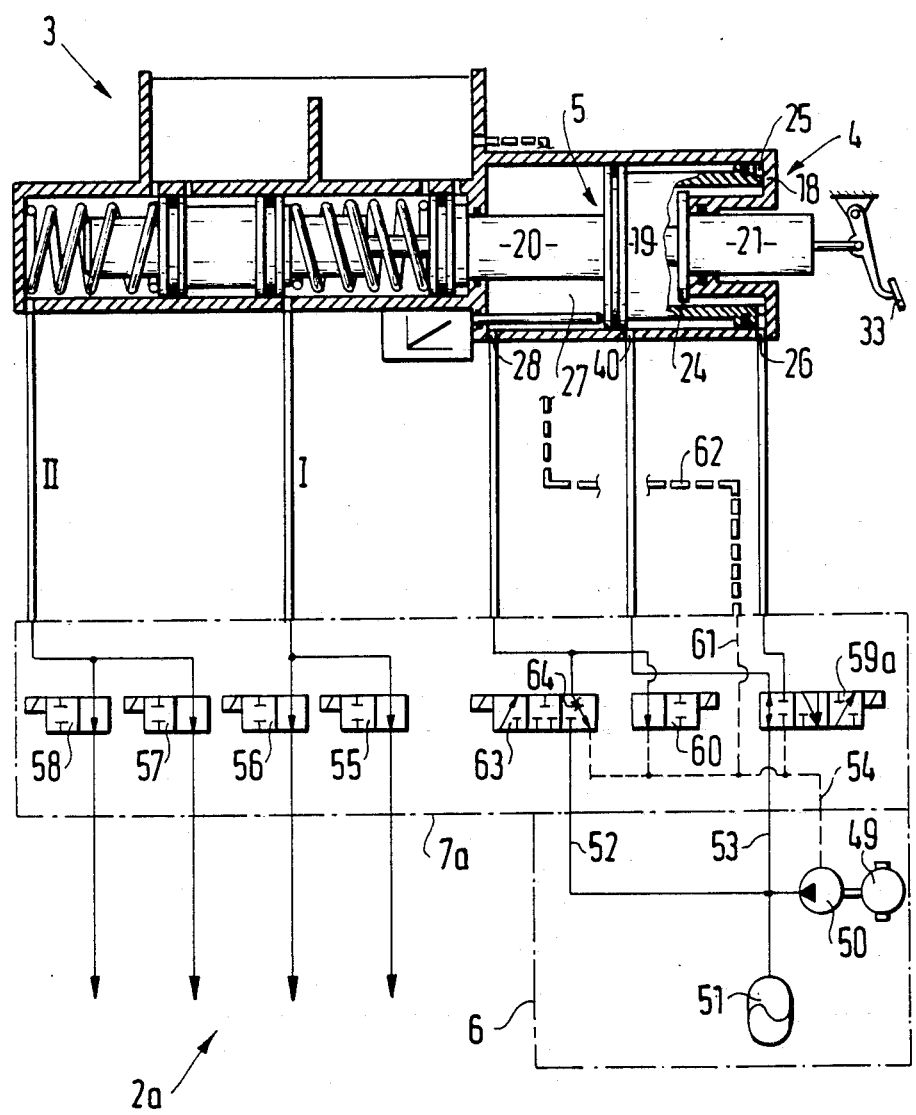
FIG. 2 shows a second exemplary embodiment of the brake system according to the invention.

The second exemplary embodiment of the brake system 2a according to FIG. 2 includes the following elements unchanged from the first exemplary embodiment: the master cylinder 3, the brake booster 4 (for instance with the exception of the stops 47), the brake valve 5 and the pressure supply device 6. An anti-drive-slip apparatus 7a is distinguished from the anti-drive-wheel-slip apparatus 7 of the first exemplary embodiment by a further embodiment so that it becomes an anti-skid brake system.

The anti-drive-wheel-slip apparatus 7a again includes brake pressure maintenance valves 55 through 58 and a 2/2-way valve 60, but which in this case serves primarily as a safety valve. Instead of the 3/3-way valve 59 of the first exemplary embodiment, a further embodiment into a 4/3-way valve 59a is incorporated. In terms of the possible connections of the booster chamber connection 26 with the pressure supply line 53 and the return line 54 of the pressure supply device 6, there are identical functions. However, the supply connection 40 for the brake valve 5 is connected to the pressure supply line 53 via this 4/3-way valve 59a. This connection exists whenever the 4/3-way valve 59a is located in its basic position. If the 4/3-way valve 59a is directed into a switching position, then in addition to the pressure supply connection 26, the supply connection 40 as well is relieved of pressure. In this switching position, the pressure supply device 6 therefor furnishes no pressure medium to the pressure supply connection 40 and the brake valve 5. In an additional switching position, the 4/3-way valve 59a blocks the supply connection 40 both with respect to the pressure supply line 53 and with respect to the return line 54. In this switching position, the 4/3-way valve 59a does, however, join the pressure supply line 53 with the booster chamber connection 26. Parallel to the 2/2-way valve 60, there is a 3/3-way valve 63 located between the auxiliary chamber connection 28 and the pressure supply device 6.

In its basic position, the 3/3-way valve 63 joins the auxiliary chamber connection 28 to the return line 54. In a further switching position, the connection to this return line 54 and also to the pressure supply line 52 is interrupted. A further switching position serves to divide the auxiliary chamber connection 28 from the return line 54 and join it to the pressure supply line 52. As a result, on the one hand a connection with the return line 54 is normally present as it is by means of the 2/2-way valve 60; on the other hand, in the same manner as with the 2/2-way valve 60, the connection with the return flow line 54 can also be interrupted. In the two positions described, there is accordingly identical function in principle with the 2/2-way valve 60. What is unique to this embodiment, however, is the opportunity by means of the other additional switching position of directing pressure from the pressure supply line 52 through the auxiliary chamber connection 28 and into the auxiliary chamber 27. The 3/3-way valve 63 for instance has a throttle 64 which is effective in this valve's basic position.

Mode of Operation of the Second Exemplary Embodiment

Braking with and without brake boosting takes place in the same manner as in the first exemplary embodiment.

If drive wheel slip arises, then again pressure which prevails in the pressure supply line 53 is delivered to the booster chamber connection 26 by means of a valve, which as already described has been further embodied into a 4/3-way valve 59a. As a result, the booster piston 19 moves back in the direction of its basic position toward the end wall 18, with the desired result that the brake pressures in the brake circuits I and II drop.

In the event that during braking controlled by means of the brake pedal 33 and supported with pressure medium from the pressure supply device 6, undesired braking wheel slip or even a danger of wheel locking should occur then the brake valve 5 can be divided from the pressure supply line 53, for instance initially by means of the 4/3-way valve 59a, and joined to the return line 54. As a result the pressure which has been fed into the booster chamber 25 by means of the brake valve 5 is reduced, so that the brake boosting decreases as well. As in the anti-drive-slip situation, the brake pressure maintenance valves of those wheels the movement status of which can be considered normal are logically closed. Only the brake pressure maintenance valve or valves at the associated wheels with which an unallowable brake slip occurs are kept open, so that brake pressure reductions in the master cylinder 3 extend as far as those wheel brakes. Once the danger of locking has been overcome, then by switching over the 4/3-way valve 59a, the boosting pressure from the boosting chamber 25 is once again established. No outflow of pressure medium through the booster chamber connection 26 takes place. In order to obtain the original boosting pressure, pressure medium again flows to the supply connection 40 and into the brake valve 5.

Since it cannot be precluded that the brake pedal 33 may be pressed down much too far toward the master cylinder 3 in comparison with the grip of the road surface, which hinders or even prevents a sufficient return stroke distance of the booster piston 19 in the direction of the initial position, the 3/3-way valve 63 can be switched into that control position in which it joins the auxiliary chamber 27 to the pressure supply line 52. At the same time, a closure of the 2/2-way valve 60 takes place as well. As a result the booster piston 19 is acted upon such that it moves toward the stop collar 24 of the tappet 21 and displaces the tappet, even against the wishes of the driver toward its basic position. As a result brake pressure can be reduced down to 0 even, which is of particular advantage when driving on curves on an icy surface. When brake pressure is built up once again, for instance, in the last-described situation above, the throttle 64 is advantageous because as long as the 2-2 way valve 60 is kept closed this throttle 64 prevents an excessively fast displacement of the booster piston 19 in the direction of the master cylinder 3 and accordingly also prevents an excessively rapid rise of brake pressures in the brake circuits I and II. On the other hand the 2/2-way valve 60 has the task of enabling a sufficiently fast displacement of the booster piston 19 during normal braking, with control of the brake pedal 33. In other words, a damping of movement for the booster piston 19 can be switched on and off by means of the 2/2-way valve 60. This 2/2-way valve 60 also serves as a supplementary safety valve in the event that the 3/3-way valve 63 should become stuck in one of its control positions. As a result, it is always possible to displace the booster piston 19 in the direction of the master cylinder 3.

The stop 47 of the first exemplary embodiment can be included in the second exemplary embodiment as well, in order to provide the second exemplary embodiment with the same advantages above described resulting from stop 47.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A brake system of anti-driven wheel slip type having a master cylinder for generating brake pressures in at least one closed brake circuit and having a brake booster combined therewith said brake booster further having a booster cylinder, a booster piston displaceable therein connected to a piston rod oriented counter to the master cylinder, an auxiliary chamber disposed within the booster cylinder surrounding the piston rod, a booster chamber further disposed within the booster cylinder and in oppositely disposed relation to the auxiliary chamber, a tappet oriented counter to the booster piston, and being arranged to plunge into the booster chamber, which tappet is displaceable by means of a brake pedal, and said system further having a brake valve connected to a pressure supply source, said brake valve being arranged for actuation by relative movement of the tappet with respect to the booster piston, said relative movement serving to feed boosting pressure into the booster chamber and to relieve boosting pressure via a return line, said brake system further having an electrically controllable valve assembly for feeding pressure into the booster chamber and for subsequently relieving said pressure therefrom, said valve assembly being disposed between the pressure supply source and the booster chamber, means at least for decreasing outflow of a pressure medium through the brake valve during pressure feed into the booster chamber, and a brake pressure maintenance valve built into said at least one closed brake circuit.

2. A brake system of the anti-driven wheel slip type as defined by claim 1, further wherein the brake valve is integrated into the booster piston and supplied thereby with pressure medium from the pressure supply device via at least one outlet bore arranged to discharge into the auxiliary chamber of the booster cylinder on a side thereof nearer the master cylinder, and said brake valve further includes a control slide selectively orientable between one of a normal pressure reduction position, a normal pressure buildup position and a third control position in which the brake valve serves to separate the booster chamber from the auxiliary chamber by displacement of the booster piston toward the master cylinder.

3. A brake system of the anti-driven wheel slip type as defined by claim 2, further wherein when the tappet is in an initial unactuated position, maintained by a restoring spring, adjacent the brake valve, the booster piston assumes an associated basic position near the brake valve such that a throttle cross-section is defined by a partial coincidence of cross-sections between the at least one outlet bore and an associated pressure-reducing control bore said throttle cross section being smaller than a cross section formed upon complete coincidence thereof when the tappet is located in said initial position and the booster piston has been displaced from its basic position by a predetermined partial travel toward the master cylinder.

4. A brake system of the anti-driven wheel slip type as defined by claim 2, further wherein the tappet is coupled to the booster piston and an idle stroke device is associated therewith such that the control slide assumes said third position blocking the brake valve when an idle stroke has ended.

5. A brake system of the anti-driven wheel slip type as defined by claim 3, further wherein the tappet is coupled to the booster piston and an idle stroke device is associated therewith such that the control slide assumes said third position blocking the brake valve when an idle stroke has ended.

6. A brake system of the anti-driven wheel slip type as defined by by claim 4, further wherein the idle stroke device comprises at least one stop means disposed upon the booster piston and one stop collar secured upon the tappet.

7. A brake system of the anti-driven wheel slip type as defined by claim 1, further wherein the piston rod is cylindrically embodied, the booster cylinder includes an end wall adjacent to the master cylinder having a bore therein through which at least a portion of said piston rod is displaceable into the master cylinder in a sealing manner, the booster cylinder further includes an auxiliary chamber connection adjacent to said end wall between which connection and the return line of the pressure supply device a normally open valve is disposed, which valve, to initiate drive slip reduction, is briefly closed to allow displacement of the booster piston for closing the brake valve.

8. A brake system of the anti-driven wheel slip type as defined by claim 2, further wherein the piston rod is cylindrically embodied, the booster cylinder includes an end wall adjacent to the master cylinder having a bore therein through which at least a portion of said piston rod is displaceable into the master cylinder in a sealing manner, the booster cylinder further includes an auxiliary chamber connection adjacent to said end wall between which connection and the return line of the pressure supply device, a normally open valve is disposed, which valve, to initiate drive slip reduction, is briefly closed to allow displacement of the booster piston for closing the brake valve.

9. A brake system of the anti-driven wheel slip type as defined by claim 3, further wherein the piston rod is cylindrically embodied, the booster cylinder includes an end wall adjacent to the master cylinder having a bore therein through which at least a portion of said piston rod is displaceable into the master cylinder in a sealing manner, the booster cylinder further includes an auxiliary chamber connection adjacent to said end wall between which connection and the return line of the pressure supply device, a normally open valve is disposed, which valve, to initiate drive slip reduction, is briefly closed to allow displacement of the booster piston for closing the brake valve.

10. A brake system of the anti-driven wheel slip type as defined by claim 4, further wherein the piston rod is cylindrically embodied, the booster cylinder includes an end wall adjacent to the master cylinder having a bore therein through which at least a portion of said piston rod is displaceable into the master cylinder in a sealing manner, the booster cylinder further includes an auxiliary chamber connection adjacent to said end wall between which connection and the return line of the pressure supply device, a normally open valve is disposed, which valve, to initiate drive slip reduction, is briefly closed to allow displacement of the booster piston for closing the brake valve.

11. A brake system of the anti-driven wheel slip type as defined by claim 5, further wherein the piston rod is cylindrically embodied, the booster cylinder includes an end wall adjacent to the master cylinder having a bore therein through which at least a portion of said piston rod is displaceable into the master cylinder in a sealing manner, the booster cylinder further includes an auxiliary chamber connection adjacent to said end wall between which connection and the return line of the pressure supply device, a normally open valve is disposed, which valve, to initiate drive slip reduction, is briefly closed to allow displacement of the booster piston for closing the brake valve.

12. A brake system of the anti-driven wheel slip type as defined by claim 1, further wherein said electrically controllable valve assembly comprises a 4/3-way valve, said valve having a first position joining a supply connection of the brake valve to the pressure supply device, a second position relieving the supply connection and a booster chamber connection of the booster chamber into the return line of the pressure supply device, and a third position dividing the supply connection from the pressure supply device and joining the pressure supply device with the booster chamber connection to feed pressure medium into the booster chamber in order to reduce drive slip, and a 3/3-way valve is disposed between an auxiliary chamber connection, a pressure supply line and the return line, said 3/3-way valve having a first switching position relieving the auxiliary chamber via the auxiliary chamber connection, a second switching position blocking off the auxiliary chamber connection, and in a third switching position joining the auxiliary chamber connection with the pressure supply line of the pressure supply device to actuate the booster piston.

13. A brake system of the anti-driven wheel slip type as defined by claim 2, further wherein said electrically controllable valve assembly comprises a 4/3-way valve, said valve having a first position joining a supply connection of the brake valve to the pressure supply device, a second position relieving the supply connection and a booster chamber connection of the booster chamber into the return line of the preesure supply device, and a third position dividing the supply connection from the pressure supply device and joining the pressure supply device with the booster chamber connection to feed pressure medium into the booster chamber in order to reduce drive slip, and a 3/3-way valve is disposed between an auxiliary chamber connection, a pressure supply line and the return line, said 3/3-way valve having a first switching position relieving the auxiliary chamber via the auxiliary chamber connection, a second switching position blocking off the auxiliary chamber connection, and in a third switching position joining the auxiliary chamber connection with the pressure supply line of the pressure supply device to actuate the booster piston.

14. A brake system of the anti-driven wheel slip type as defined by claim 3, further wherein said electrically controllable valve assembly comprises a 4/3-way valve, said valve having a first position joining a supply connection of the brake valve to the pressure supply device, a second position relieving the supply connection and a booster chamber connection of the booster chamber into the return line of the pressure supply device, and a third position dividing the supply connection from the pressure supply device and joining the pressure supply device with the booster chamber connection to feed pressure medium into the booster chamber in order to reduce drive slip, and a 3/3-way valve is disposed between an auxiliary chamber connection, a pressure supply line and the return line, said 3/3-way valve having a first switching position relieving the auxiliary chamber via the auxiliary chamber connection, a second switching position blocking off the auxiliary chamber connection, and in a third switching position joining the auxiliary chamber connection with the pressure supply line of the pressure supply device to actuate the booster piston.

15. A brake system of the anti-driven wheel slip type as defined by claim 4, further wherein said electrically controllable valve assembly comprises a 4/3-way valve, said valve having a first position joining a supply connection of the brake valve to the pressure supply device, a second position relieving the supply connection and a booster chamber connection of the booster chamber into the return line of the pressure supply device, and a third position dividing the supply connection from the pressure supply device and joining the pressure supply device with the booster chamber connection to feed pressure medium into the booster chamber in order to reduce drive slip, and a 3/3-way valve is disposed between an auxiliary chamber connection, a pressure supply line and the return line, said 3/3-way valve having a first switching position relieving the auxiliary chamber via the auxiliary chamber connection, a second switching position blocking off the auxiliary chamber connection, and in a third switching position joining the auxiliary chamber connection with the pressure supply line of the pressure supply device to actuate the booster piston.

16. A brake system of the anti-driven wheel slip type as defined by claim 5, further wherein said electrically controllable valve assembly comprises a 4/3-way valve, said valve having a first position joining a supply connection of the brake valve to the pressure supply device, a second position relieving the supply connection and a booster chamber connection of the booster chamber into the return line of the pressure supply device, and a third position dividing the supply connection from the pressure supply device and joining the pressure supply device with the booster chamber connection to feed pressure medium into the booster chamber in order to reduce drive slip, and a 3/3-way valve is disposed between an auxiliary chamber connection, a pressure supply line and the return line, said 3/3-way valve having a first switching position relieving the auxiliary chamber via the auxiliary chamber connection, a second switching position blocking off the auxiliary chamber connection, and in a third switching position joining the auxiliary chamber connection with the pressure supply line of the pressure supply device to actuate the booster piston.

17. A brake system of the anti-driven wheel slip type as defined by claim 6, further wherein said electrically controllable valve assembly comprises a 4/3-way valve, said valve having a first position joining a supply connection of the brake valve to the pressure supply device, a second position relieving the supply connection and a booster chamber connection of the booster chamber into the return line of the preesure supply device, and a third position dividing the supply connection from the pressure supply device and joining the pressure supply device with the booster chamber connection to feed pressure medium into the booster chamber in order to reduce drive slip, and a 3/3-way valve is disposed between an auxiliary chamber connection, a pressure supply line and the return line, said 3/3-way valve having a first switching position relieving the auxiliary chamber via the auxiliary chamber connection, a second switching position blocking off the auxiliary chamber connection, and in a third switching position joining the auxiliary chamber connection with the pressure supply line of the pressure supply device to actuate the booster piston.

18. A brake system of the anti-driven wheel slip type as defined by claim 12, further wherein the 3/3-way valve includes a throttle means through which pressure medium flows during pressure relieving of the auxiliary chamber.

19. A brake system of the anti-driven wheel slip type as defined by claim 12, further wherein a safety valve, comprising a 2/2-way valve open in an initial position so as to relieve the auxiliary chamber of pressure, is disposed so as to bypass the 3/3-way valve.

20. A brake system of the anti-driven wheel slip type as defined by claim 18, further wherein a safety valve, comprising a 2/2-way valve open in an initial position so as to relieve the auxiliary chamber of pressure, is disposed so as to bypass the 3/3-way valve.

* * * * *